United States Patent Office 3,376,322
Patented Apr. 2, 1968

3,376,322
DIORGANOOXYDISULFIDE ESTERS
Quentin E. Thompson, Belleville, Ill., assignor to Monsanto Company, St. Louis, Mo., a corporation of Delaware
No Drawing. Filed Dec. 28, 1964, Ser. No. 421,678
17 Claims. (Cl. 260—397.2)

ABSTRACT OF THE DISCLOSURE

Disulfide esters of bivalent sulfur represented by the structure

R—O—S—S—O—R' wherein R and R' are each selected from the group consisting of alkyl radicals and substituted alkyl radicals, said alkyl radicals having from 5 to 20 carbon atoms, arylalkyl radicals having from 7 to 24 carbon atoms, alkenyl groups having from 3 to 20 carbon atoms and cycloalkyl radicals having from 4 to 30 carbon atoms and their method of preparation which comprises reacting a monohydric alcohol with sulfur monochloride in the presence of a tertiary amine and said esters are useful as additives to increase the lubricity of mineral oils, as insecticides and fungicides and as curing agents in the vulcanization of rubber.

---

This invention relates to novel disulfide esters of bivalent sulfur and to their method of preparation. The novel compounds of this invention are represented by the structure

R—O—S—S—O—R' wherein R and R' are each selected from the group consisting of alkyl radicals and substituted alkyl radicals, said alkyl radicals having from 5 to 20 carbon atoms, arylalkyl radicals having from 7 to 24 carbon atoms, alkenyl groups having from 3 to 20 carbon atoms, and cycloalkyl radicals having from 4 to 30 carbon atoms.

The compounds of this invention are prepared by reacting monohydric alcohol with sulfur monochloride ($S_2Cl_2$) in the presence of at least two mols of a tertiary amine per mol of sulfur monochloride. Generally, the disulfide esters of this invention are prepared by first combining a monohydric alcohol with a tertiary amine. To the mixture of alcohol and amine, there is added sulfur monochloride. Alternatively, the amine and monochloride can be added to the alcohol simultaneously in a manner which provides, at all times in the reaction mixture, the above-stated molar ratio of tertiary amine and sulfur monochloride. The reaction of the alcohol with sulfur monochloride takes place with surprising ease at temperatures in the range of about —50° C. to about 80° C. and preferably from 0° C. to 25° C. It is usually more convenient to add the sulfur monochloride stepwise, with moderate agitation, to the alcohol-amine mixture. Although the reaction takes place nearly instantaneously, it is sometimes advisable to agitate the reaction mixture during the addition of sulfur monochloride and for a short time thereafter to assure completion of the reaction.

When a combination of alcohols is employed simultaneously in the method of this invention, there is produced a composition containing disulfide esters which have different R and R' groups. A composition thus produced also has, in varying amounts, esters in which R and R' are the same. For example, when both ethyl alcohol and butyl alcohol together are reacted with sulfur monochloride according to the method of this invention, the esters produced by the reaction are ethoxybutoxydisulfide, diethoxydisulfide and dibutoxydisulfide.

The tertiary amine used in the process of this invention functions as an acid acceptor in the reaction mixture and forms a hydrochloride salt by combining with hydrogen chloride, which is formed as a by-product in the reaction of alcohol and sulfur monochloride. At the completion of the reaction, removal of the amine salt is conveniently accomplished by extraction with water, preferably ice water. The water-soluble amine salt separates from the water-insoluble disulfide ester and is decanted with the aqueous phase of the mixture.

In the preferred method of this invention, an inert or neutral diluent liquid is employed as a reaction medium and as an aid in the addition of the reactants to the reaction vessel. Conveniently, the tertiary amine and alcohol are combined in a diluent before sulfur monochloride is combined therewith. It is also convenient to have the sulfur monochloride combined with an inert diluent which can be the same or a different diluent than is used with the alcohol-amine mixture. Typical examples of diluents useful in the method of this invention are chlorinated hydrocarbon, such as carbon tetrachloride, trichloromethane (chloroform) and preferably dichloromethane, and aliphatic and cycloaliphatic ethers, such as diethyl ether, tetrahydrofuran, diisopropyl ether and dioxane. Also, tertiary amine may be used as a diluent by adding an amount in excess of that required to combine with all of the hydrogen chloride produced by the reaction. Similarly, an excess of the alcohol being employed in the reaction may be used as a diluent provided its physical properties, such as boiling point and melting point, do not render it inconvenient for use as a reaction medium. An inert diluent is employed to render the reaction mixture stirrable during and after completion of the reaction. The amount of diluent will vary depending upon the characteristics of the particular monohydric alcohol employed and the solubility of the amine hydrochloride produced. One skilled in the art can easily determine the amount of diluent convenient for particular compounds by following the teaching of the examples hereinafter set forth. When a diluent is employed in the method of this invention, it is selected so that its volatility will be sufficiently different from that of the desired ester to ensure easy separation of the two materials. The crude ester depending on its physical properties is purified by conventional techniques such as distillation, crystallization or solvent extraction.

Monohydric alcohols which can be employed in the method of this invention include primary, secondary and tertiary alcohols. Said alcohols can be aliphatic, aromatic or cycloaliphatic and may contain other substituents in the molecule, such as alkoxy, sulfide, nitro groups, halogens and unsaturated carbon-to-carbon bonding. The examples which follow indicate the broad variety of alcohols useful in the successful practice of this invention.

Tertiary amines suitable for use in the method of this invention are those capable of forming amine salts with hydrogen chloride. Aliphatic, heterocyclic and aromatic amines are capable of utilization. Typical amines are trialkyl amines wherein the alkyl radicals have from 1 to 12 carbon atoms, examples of which are trimethylamine, tripropylamine, tributylamine, tri-n-decylamine, dimethylethylamine, dipropylbutylamine and dimethylcyclohexylamine; heterocyclic amines, examples of which are pyridine, quinoline, pyrimidine, N-methyl piperidine and N-ethyl morpholine; and aromatic amines, examples of which are N,N'-diethylaniline, N,N'-dimethylaniline and N-methyl diphenylamine. As a practical matter, a small amount in excess of the stoichiometric amount required can be employed to assure that all of the hydrogen chloride formed goes to the hydrochloride salt and thereby prevent any reaction of the disulfide ester with hydrogen chloride.

The following examples illustrate specific embodiments of this invention but are not to be construed as limiting its scope. Compositions are given as percent by weight. Parts are parts by weight. The reactor employed in all of the following examples was equipped with means for determining temperature of the reactants, means for agitating the contents, and means for the addition and removal of the reactants and products.

EXAMPLE 1

Into a reactor there was placed 120 parts of 1-propenol-3, 204 parts of triethylamine and 800 parts of dichloromethane. The mixture was cooled to 5° C. and 180 parts of sulfur monochloride dissolved in 113.5 parts of dichloromethane was added slowly over a period of 60 minutes. The reaction mixture was maintained in the range of 0° C. to 10° C. and agitated during the addition of sulfur monochloride and for a period of 30 minutes after the end of the addition. The reaction mixture was then washed three times with 600 parts of water in three equal portions, and the dichloromethane was removed by evaporation, leaving 177 parts of di-3-propenoxydisulfide, an orange-colored oil having a refractive index, $n_D^{25}$ of 1.5135. The oil was subjected to elemental analysis, the results of which are presented below:

Calculated: Carbon, 40.42 percent; hydrogen, 5.65 percent; sulfur, 35.97 percent. Found: Carbon, 40.31 percent; hydrogen, 5.58 percent; sulfur, 36.10 percent.

EXAMPLE 2

Into a reactor there was placed 110 parts of benzyl alcohol, 103 parts of triethylamine and 667 parts of dichloromethane. The reaction mixture was cooled to a temperature in the range of from 0° C. to 10° C., and 67.5 parts of sulfur monochloride combined with 66.7 parts of dichloromethane was slowly added. The reaction mixure was maintained at a temperature in the range of 0° to 10° C. and stirred for 30 minutes after the completion of the sulfur monochloride addition. The reaction mixture was washed with 900 parts of water in three equal portions, leaving 138.1 parts of a light-colored fluid. The diluent was removed from the reaction product under reduced pressure. The crude ester was purified by three successive extractions with 100 parts of methanol and one extraction from the methanol with hexane. The hexane solution was run through a 10″ by ¾″ column of 12- to 60-mesh activated carbon, after which the hexane was evaporated by heating under vacuum. The residue, dibenzyloxydisulfide, a colorless oil having an index of refraction, $n_D^{25}$ of 1.5994, was subjected to elemental analysis, the results of which are presented below.

Calculated: Carbon, 60.39 percent; hydrogen, 5.07 percent; sulfur, 23.04 percent. Found: Carbon, 60.10 percent; hydrogen, 5.10 percent; sulfur, 22.94 percent.

EXAMPLE 3

Into a reactor there was placed 38.6 parts of cholesterol, 10.2 parts of triethylamine and 400.5 parts of dichloromethane. To this mixture was slowly added 6.7 parts of sulfur monochloride. The reaction mixture was maintained at 20° C. and agitated for one hour after the addition of the sulfur monochloride. A white crystalline precipitate was collected after washing the reaction mixture with water and filtering. The crystalline precipitate was recrystallized from dioxane. The recrystallized sample was again recrystallized from dioxane, yielding pure white needles melting at 1790-180° C. The product, di-cholesteryloxydisulfide, was subjected to elemental analysis, the results of which are presented below.

Calculated: Carbon, 77.63 percent; hydrogen, 10.86 percent; sulfur, 7.67 percent. Found: Carbon, 77.50 percent; hydrogen, 10.86 percent; sulfur, 7.45 percent.

EXAMPLE 4

Into a reactor there was placed 108 parts of n-octadecanol combined with 934 parts of trichloromethane and 42 parts of triethylamine. To this mixture was slowly added 27 parts of sulfur monochloride. The temperature of the reaction mixture was maintained in the range of 15° C. to 22° C. and was agitated one hour after the addition of sulfur monochloride. The reaction mixture was then washed with ice water, removing the triethylamine hydrochloride and leaving a white crystalline product. The product was recrystallized twice from dichloromethane, leaving a white crystalline material melting at 49° C. to 50° C. The product, di-n-octadecyloxydisulfide, was subjected to elemental analysis, the results of which are presented below.

Calculated: Carbon, 71.69 percent; hydrogen, 12.37 percent; sulfur, 10.63 percent. Found: Carbon, 71.63 percent; hydrogen, 12.42; sulfur, 10.53 percent.

EXAMPLE 5

Using the same procedure as stated in Example 4, di-dodecyloxydisulfide, an orange oil which had an index of refraction, $n_D^{25}$ of 1.4700, was produced. The material was subjected to elemental analysis, the results of which appear below.

Calculated: Carbon, 66.29 percent; hydrogen, 11.59 percent; sulfur, 14.75 percent. Found: Carbon, 66.41 percent; hydrogen, 11.79; sulfur, 14.72 percent.

EXAMPLE 6

The procedure of Example 4 was repeated using 130 parts of n-octanol, 102 parts of triethylamine, 667.5 parts of methylene dichloride and 67.5 parts of sulfur monochloride. Approximately 156.5 parts of di-n-octyloxydisulfide, an orange oil having an index of refraction, $n_D^{25}$ of 1.4668, was produced. The product was washed twice with methanol and then dissolved in hexane, then put through a column packed with alumina and charcoal to decolorize the product. The product was subjected to elemental analysis, the results of which appear below.

Calculated: Carbon, 59.57 percent; hydrogen, 10.63 percent; sulfur, 19.88 percent. Found: Carbon, 59.75 percent; hydrogen, 10.70 percent; sulfur, 19.81 percent.

EXAMPLE 7

Into a reactor was placed 130 parts of 2-ethylhexanol, 102 parts of triethylamine and 667.5 parts of dichloromethane. After cooling the mixture to 10° C., 67.5 parts of sulfur monochloride was added slowly over a period of 40 minutes. The reaction mixture was agitated for 20 minutes after the addition of sulfur monochloride and maintained at a temperature in the range of 10–15° C. The amine salt was removed by washing with ice water, and the reaction mixture was heated under reduced pressure to remove the dichloromethane by evaporation. The residue was washed twice with methanol, dissolved in hexane and filtered through carbon. The hexane was removed by distillation, yielding di-2-ethylhexyloxydisulfide, a light oil having an index of refraction, $n_D^{25}$ of 1.4733, which was subjected to elemental analysis, the results of which appear below.

Calculated: Carbon, 59.57%; hydrogen, 10.62; sulfur, 19.88%. Found: carbon, 59.64%; hydrogen, 10.66%; sulfur, 20.00%.

EXAMPLE 8

Into a reactor was placed 102.2 parts of 4-methyl-2-pentanol, 102 parts of triethylamine and 400.5 parts of dichloromethane. To this mixture was added slowly over a period of 40 minutes 67.5 parts of sulfur monochloride combined with 133.5 parts of dichloromethane. The reaction temperature was maintained in the range of 8–12° C. and was agitated 10 minutes after the completion of the sulfur monochloride addition, at which time the reaction mixture was washed three times with water. After removing diluent, the organic residue was vacuum distilled. The major portion of distillate was di-4-methyl-2-pentyloxydisulfide, a colorless oil having an index of refraction, $n_D^{25}$ of 1.4639, which was subjected to elemental analysis, the results of which appear below.

Calculated: Carbon, 54.09%; hydrogen, 9.84%; sulfur, 24.06. Found: carbon, 54.01%; hydrogen, 9.94%; sulfur, 24.28%.

EXAMPLE 9

Into a reactor was charged 100 parts of cyclohexanol, 102 parts of triethylamine and 400 parts of dichloromethane. To the reaction mixture was added, over a one-hour period, 67.5 parts of sulfur monochloride combined with 100 parts of dichloromethane. The reaction temperature was maintained in the range of 10–15° C. and was allowed to continue for 10 minutes after the addition of sulfur monochloride. The amine salt was removed from the reaction mixture by washing the reaction mixture with water and separating the non-aqueous portion. The dichloromethane was removed under reduced pressure, and the residue was washed twice with methanol combined with 200 parts of hexane, and then filtered through alumina. The hexane solution was then filtered through a charcoal column, yielding a clear effluent, dicyclohexyloxydisulfide, having an index of refraction, $n_D^{25}$ of 1.5216, which was subjected to elemental analysis, the results of which appear below.

Calculated: Carbon, 54.92%; hydrogen, 8.45%; sulfur, 24.43%. Found: carbon, 54.72%; hydrogen, 8.37%; sulfur, 24.54%.

EXAMPLE 10

Using the procedure of the previous example, 106 parts of ethylmercaptoethanol was caused to react with 67.5 parts of sulfur monochloride in the presence of 102 parts of triethylamine and 600 parts of dichloromethane. After removal of the amine salt and solvent, the crude product was purified as described in the preceding example. The purified product, $\beta,\beta'$-bis-mercaptoethyldiethoxydisulfide, having an index of refraction, $n_D^{25}$ of 1.5473, was subjected to elemental analysis, the results of which appear below.

Calculated: Carbon, 35%; hydrogen, 6.61%; sulfur, 46.72. Found: carbon, 34.94; hydrogen, 6.79%; sulfur, 46.54%.

EXAMPLE 11

The procedure of Example 9 was repeated using 90 parts of ethyleneglycolmonoethyl ether with 67.5 parts of sulfur monochloride in the presence of 103 parts of triethylamine and 534 parts of dichloromethane. The reaction product was isolated in the same manner as was described in Example 9. The product of this example, $\beta,\beta'$-bis-ethoxydiethoxydisulfide, having an index of refraction, $n_D^{25}$ of 1.4779, was subjected to elemental analysis, the results of which appear below.

Calculated: Carbon, 39.64%; hydrogen, 7.48%; sulfur, 26.45. Found: carbon, 39.53; hydrogen, 7.61; sulfur, 26.77.

EXAMPLE 12

Into a reactor there was charged 207 parts of "heavy oxo fraction" hydroxyl number of 135, 95% distillable at 360° C., which is a mixture of alcohols consisting of the higher boiling fraction obtained from the fractional distillation of the alcohols produced by the oxo process, 51 parts of triethylamine and 411 parts of dichloromethane. To the mixture was added slowly 34 parts of sulfur monochloride. The reaction temperature was maintained in the range of 5° C. to 15° C. and agitated for 30 minutes after the addition of sulfur monochloride. The reaction product was isolated by washing out amine hydrochloride and by removing the diluent. A yellow oil having an index of refraction, $n_D^{25}$ of 1.4547, was produced having a sulfur content of 7.12%. The theoretical value, based on the hydroxyl number of the alcohol sample used, was 7.16%.

In addition to the alcohols employed in the foregoing examples, other monohydric alcohols can be used to prepare compounds of this invention; for example, aliphatic alcohols such as the alkyl alcohol, methyl alcohol, ethyl alcohol, n-propyl alcohol and isopropyl alcohol, n-amyl alcohol (sec.-, iso- and tert.-), hexyl alcohol, octyl alcohol (sec.-, iso- and tert.-), diisobutyl alcohol, capryl alcohol, nonyl alcohol, diisobutylcarbinol, alkenyl alcohol such as butenyl alcohols, pentenyl alcohols (n-, sec.- and tert.-, hexenyl alcohols (n-, sec.- and tert.-), octenyl alcohol (n-, sec.- and tert.-), diisobutenyl alcohol (n-, iso- and tert.-), nonenyl alcohols; cycloaliphatic alcohols such as cyclopentyl, alkylated-cyclopentyl, alkylated-cyclohexyl alcohols, e.g., mono- and polymethylcyclopentyl alcohols, polymethylcyclohexyl alcohols, mono- and polyethyl cyclohexyl alcohols, mono- and polyisopropyl cyclohexyl alcohols, mono- and poly-tert.-amyl cyclohexyl alcohols, n-octylcyclohexyl alcohol, diisobuylcyclohexyl alcohol; aliphatic-substituted aryl alcohols such as bezyl alcohol, m- and p-methyl benzyl alcohols, m- and p-capryl benzyl alcohol, diisobutylbenzyl alcohol, $\alpha$ and $\beta$-phenylethyl alcohols, 2- and 3-phenylpropyl alcohols, 1-phenyloctadecyl alcohol; oxygen-containing aliphatic alcohols such as n-propoxy-ethyl alcohol, isopropoxy ethyl alcohol, n-, iso- and tert.-butoxyethyl alcohol, 3,3-di-n-butoxy-propyl alcohol, 2,3-di-n-butoxy-propyl alcohol, 3,3-di-n-n-octoxypropyl alcohol, 2,3-bis (diisobutoxy)propyl alcohol; sulfur-containing alcohols such as methylmercaptoethanol, 2-, 3- or 4-methylmercaptobutanol, 2- or 3-methylmercaptopropanol, methylmercaptoentanols, methylmercaptooctanols, butylmercaptoethanol and 2-octylmercaptopropanol.

Moreover, while specific alcohols have been described for purposes of illlstration, all the various isomeric forms of these alcohols and mixtures thereof are suitable for use in the process of this invention. Furthermore, the source of the alcohol does not affect the process, and thus, for example, aliphatic alcohols derived from a one- or two-stage oxo process, by the dehydration of olefins or by the catalytic hydrogenation of coconut oil, can be used and are, in fact, desirable because of their availability.

In a similar manner as that described in the examples given above, other compounds of this invention can be prepared; for example, di-n-tridecyloxydisulfide, di-2-nitro-2-methylpropoxydisulfide, di-2-propyl-1-heptyloxydisulfide and di-n-butoxydisulfide, di-2-methyl-2-methylpropoxydisulfide, di-3-butyl-3-butylpropoxydisulfide, di-1-methyl-1-methylbutoxydisulfide, di-1-butyl-1-butyloctyloxydisulfide and di-2-butyl-2-methylbutoxydisulfide.

The novel compounds of this invention are useful as additives to increase the lubricity of mineral oils as demonstrated in the following examples. The data are obtained on a Shell Four-Ball Extreme Pressure Testing machine using steel-on-steel balls, a rotational speed of 1730 r.p.m., a temperature of 25° C. and kilogram loads as indicated in Table I below. The duration of the test was one minute at each load on fresh balls. The control lubricant employed was SAE grade 90 mineral oil. The compounds of the invention were added to the mineral oil in an amount sufficient to provide a final composition containing 0.80% sulfur by weight.

TABLE I

| | Scar Diameter, mm. | |
|---|---|---|
| | 100 kg. Load | 150 kg. Load |
| Di-4-methyl-2-pentoxydisulfide | 0.880 | 1.45 |
| Di-n-dodecyloxydisulfide | 0.563 | 1.09 |
| Di-n-tridecyloxydisulfide | 0.804 | 1.02 |
| Di-n-octyloxydisulfide | 0.870 | 1.40 |
| Di-2-ethylhexyloxydisulfide | 0.795 | 1.10 |
| Di-2-propyl-1-heptyloxydisulfide | 0.792 | 1.21 |
| Dicyclohexyloxydisulfide | 0.792 | 1.12 |
| Control | (¹) | (¹) |

¹ Seizure.

The compounds of this invention also exhibit biological activity as insecticides and fungicides showing toxic activities towards the insect *Conotrachelus nenuphur* and the fungus *Rhizoctonia solani*.

Many of the novel disulfide esters of this invention are useful as curing agents for the vulcanization of sulfur-vulcanizable rubber. The properties of these compounds are illustrated by the following examples.

Rubber stocks were compounded in parts by weight as follows:

| | |
|---|---:|
| Smoked rubber sheets (natural) | 100.0 |
| Furnace carbon black | 50.0 |
| Zinc oxide | 3.0 |
| Stearic acid | 2.0 |
| Solvent refined paraffin oil, 60 weight | 3.0 |
| Curing agent (as stated below) | 3.5 |
| N-tert.-butyl-2-benzothiazolesulfenamide | 0.5 |

Seven rubber stock samples were prepared using the above-stated formulations but with different curing agents which are listed below. Stock No. 1 was prepared with a commercial curing agent widely used in current methods of rubber curing and is employed here as a control providing a basis of comparing curing activity.

| Stock No.: | Curing agent |
|---|---|
| 1 (control) | 4,4'-dithiodimorpholine. |
| 2 | Di-n-butyloxydisulfide. |
| 3 | Ditridecyloxydisulfide. |
| 4 | Product of Example 12. |
| 5 | Di-n-octyloxydisulfide. |
| 6 | Dioctyloxydisulfide. |
| 7 | Dicyclohexyloxydisulfide. |

The stocks so compounded were cured by heating in a press for 30 minutes at 144° C. The physical properties of the vulcanizates illustrate the powerful curing action of the new compounds.

TABLE II

| Stock | Modulus of Elasticity in lbs./in.² at Elongation of 300% | Tensile at Break in lbs./in.² | Ultimate Elongation Percent |
|---|---|---|---|
| 1 | NC | NC | NC |
| 2 | 1,900 | 3,940 | 570 |
| 3 | 1,200 | 3,090 | 580 |
| 4 | 640 | 1,710 | 510 |
| 5 | 1,490 | 3,560 | 580 |
| 6 | 1,280 | 2,960 | 540 |
| 7 | 1,300 | 2,950 | 530 |

No cure.

While this invention has been described with respect to various specific examples and embodiments, it is understood that the invention is not limited thereto and that it can be variously practiced within the scope of the following claims.

The embodiments of the invention in which an exclusive property or privilege is claimed are defined as follows:

1. A compound of the formula $$R-O-S-S-O-R'$$

wherein R and R' are each selected from the group consisting of substituted alkyl radicals wherein the substituents are selected from the group consisting of alkoxy, sulfide, nitro, halo and mercapto groups, alkyl radicals, said alkyl radicals having from 6 through 20 carbon atoms, arylalkyl radicals having from 7 through 24 carbon atoms and alkenyl radicals having from 3 through 20 carbon atoms and cycloalkyl radicals having from 4 through 30 carbon atoms.

2. Di-3-propenoxydisulfide.
3. Dibenzyloxydisulfide.
4. Dicholesteryloxydisulfide.
5. Di-n-octadecyloxydisulfide.
6. Di-n-dodecyloxydisulfide.
7. Di-n-octyloxydisulfide.
8. Di-2-ethylhexyloxydisulfide.
9. Di-4-methyl-2-pentyloxydisulfide.
10. Dicyclohexyloxydisulfide.
11. β,β'-Bis-mercaptoethyldiethoxydisulfide.
12. β,β'-Bis-ethoxydiethoxydisulfide.
13. Di-n-tridecyloxydisulfide.
14. Di-2-propyl-1-heptyloxydisulfide.
15. Di-2-nitro-2-methylpropoxydisulfide.
16. A mixture of disulfide esters prepared by the process comprising reacting sulfur monochloride with heavy oxo fraction having a hydroxyl number of 135, 95% distillable at 360° C. in the presence of at least two mols of a tertiary amine per mol of sulfur monochloride at a temperature in the range of from 5° C. to 15° C.

17. The method of producing a compound of the structure $$R-O-S-S-O-R'$$

wherein R and R' are each selected from the group consisting of substituted alkyl radicals wherein the substituents are selected from the group consisting of alkoxy, sulfide, nitro, halo and mercapto groups, alkyl radicals, said alkyl radicals having from 1 through 20 carbon atoms, arylalkyl radicals having from 7 through 24 carbon atoms and alkenyl radicals having from 3 through 20 carbon atoms and cycloalkyl radicals having from 4 through 30 carbon atoms, which comprises reacting a monohydric alcohol with sulfur monochloride in the presence of at least two mols of a tertiary amine per mol of sulfur monochloride.

References Cited

Lengfeld: Ber. Deut. Chem., vol. 28, pp. 449–451 (1895).

Stamm et al.: Ver. Deut. Chem., vol. 70. pp. 2058–2060 (1937).

FLOYD D. HIGEL, *Primary Examiner*.